May 11, 1965   J. A. TAYLOR   3,183,062
METHOD OF PRODUCING PHOSPHORUS PENTASULFIDE
Filed Nov. 13, 1961
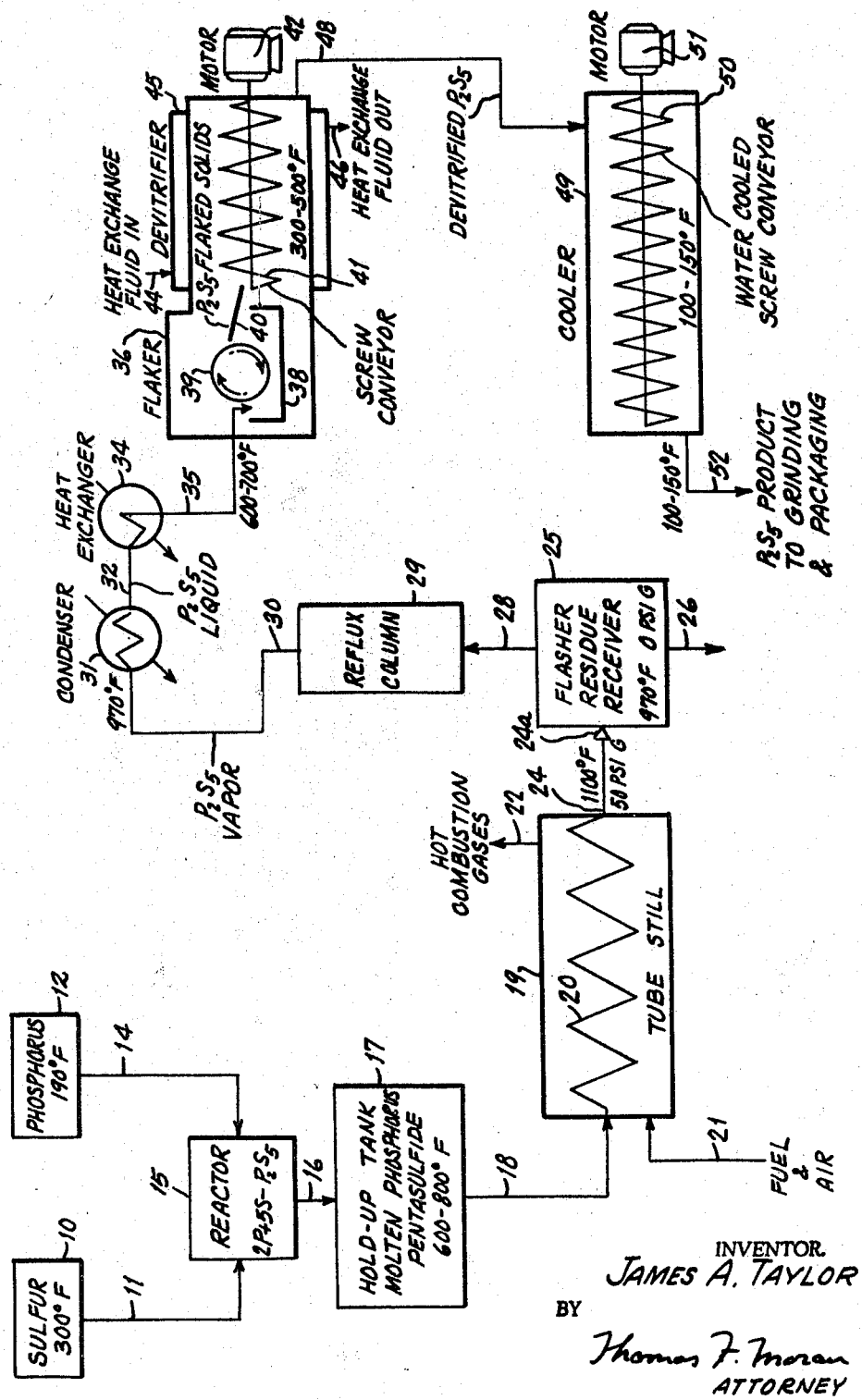
INVENTOR.
JAMES A. TAYLOR
BY
Thomas F. Moran
ATTORNEY

United States Patent Office 3,183,062
Patented May 11, 1965

3,183,062
METHOD OF PRODUCING PHOSPHORUS PENTASULFIDE
James A. Taylor, Rahway, N.J., assignor, by mesne assignments, to American Agricultural Chemical Company, a corporation of Delaware
Filed Nov. 13, 1961, Ser. No. 151,667
5 Claims. (Cl. 23—206)

This invention relates to phosphorous sulfides. More particularly, this invention relates to the manufacture of phosphorous sulfides, such as phosphorous pentasulfide, phosphorous sesquisulfide and phosphorous heptasulfide by reaction between elemental phosphorous and elemental sulfur.

Phosphorous sulfides, particularly phosphorus pentasulfide, are particularly useful in the manufacture of chemical compounds, such as chemical compounds employed as additives for improving lubricating oils.

Heretofore it has been the practice to produce phosphorus sulfide, such as phosphorus pentasulfide, by reaction between elemental phosphorus and elemental sulfur. Phosphorous sulfide is produced in the liquid phase by reacting liquid sulfur with liquid phosphorus in a mass of liquid phosphorus sulfide. By way of example, phosphorus pentasulfide has been prepared by reacting liquid phosphorus with liquid sulfur in the presence of molten phosphorus pentasulfide. Following the formation of the phosphorus pentasulfide the phosphorus pentasulfide is recovered from the reaction mixture by distallation and after subsequent condensation and solidification it is recovered as product. In the above described method for the manufacture of phosphorus pentasulfide, molten phosphorus pentasulfide acts as a heat sink to control the reaction temperature and the heat of reaction of the phosphorus and sulfur serves to effect distillation of the phosphorus pentasulfide which is subsequently condensed, solidified and after suitable heat treatment recovered as product.

In the manufacture of phosphorus sulfides, particularly phosphorus pentasulfide, by reaction between elemental phosphorus and elemental sulfur, impurities in the phosphorus and sulfur tend to accumulate in the reaction mixture comprising the molten phosphorus sulfide, with the result that from time to time the reactor containing the molten phosphorus sulfide must be purged of its contents, particularly the impurities therein. This sometimes necessitates shutting down the manufacturing plant and gives rise to the usual difficulties associated with shutting down a chemical manufacturing operation and again starting up the manufacturing operation.

Accordingly, it is an object of this invention to provide an improved process for the manufacture of phosphorus sulfides, particularly phosphorus pentasulfide.

Another object of this invention is to provide a continuous process for the manufacture of phosphorus sulfides, particularly phosphorus pentasulfide.

Still another object of this invention is to provide an improved process for the manufacture of controlled reactivity phosphorus pentasulfide.

Yet another object of this invention is to provide a process for the manufacture of phosphorus pentasulfide wherein extraneous impurities introduced into the manufacturing process by the reactants, phosphorus and sulfur, are readily separated from the reaction product, phosphorus pentasulfide.

Yet another object of this invention is to provide a continuous process for the manufacture of controlled reactivity phosphorus pentasulfide employing only elemental phosphorus and elemental sulfur as the sole reactants.

How these and other objects of this invention are achieved will become apparent in the light of the accompanying disclosure made with reference to the accompanying drawing which schematically illustrates a process flow in accordance with this invention as applied to the manufacture of phosphorus pentasulfide.

In accordance with this invention a process for the manufacture of phosphorus sulfide, such as phosphorus sesquisulfide, phosphorus heptasulfide, particularly phosphorus pentasulfide, and mixtures thereof, wherein elemental phosphorus and elemental sulfur are reacted to form the desired phosphorus sulfide, e.g. phosphorus pentasulfide, and the resulting formed molten phosphorus sulfide vaporized and eventually recovered as product, is improved by effecting the vaporization of the phosphorus sulfide by heating the reaction mixture containing the molten phosphorus sulfide to an elevated temperature $T_1$ under an elevated pressure $P_1$, the pressure $P_1$ being sufficient to maintain the heated phosphorus sulfide at the temperature $T_1$ in the liquid phase and thereupon introducing the resulting heated phosphorus sulfide at the temperature $T_1$ into a flashing or vaporization zone maintained at a relatively reduced pressure $P_2$, such as atmospheric pressure, such that the high temperature liquid phosphorus sulfide introduced thereinto is substantially completely vaporized within said flashing zone at said pressure $P_2$ and at a relatively reduced temperature $T_2$, $T_1$ being greater than $T_2$ and $P_1$ being greater than $P_2$. In the vaporization operation in the manufacture of phosphorus sulfide in accordance with this invention sufficient heat is imparted to the molten phosphorus sulfide while the heated phosphrous sulfide is maintained in the liquid phase so that when the pressurized high temperature liquid phosphorus sulfide is introduced into a low pressure zone or is subjected to the low pressure vaporization or flashing, such as by being passed through an orifice into a zone of relatively reduced pressure, sufficient heat is available in the liquid phosphorus sulfide per se, without requiring the addition of extraneous heat, to effect substantially complete vaporization of the phosphorus sulfide. Flash vaporization of the superheated liquid phosphorus sulfide effects a relatively simple and quick separation of the impurities therein, such as extraneous impurities and materials introduced into the phosphorus sulfide reaction mixture by the elemental phosphorus and sulfur reactants.

The high temperature, relatively high pressure heating zone wherein the molten phosphorus sulfide is heated and maintained in the liquid phase, superheated with respect to any liquid phosphorus which may be present in the relatively reduced pressure flashing or vaporization zone, is at an elevated temperature above about 900° F., such as a temperature above about 1000° F., e.g. a temperature in the range 1050–1150° F. in the instance of phosphorus pentasulfide. The pressure within the heating zone should be at least sufficient to maintain the heated phosphorus sulfide therein in the liquid phase. Usually a pressure substantially above atmospheric pressure, i.e. a pressure in the range 10–150 pounds per square inch above atmospheric pressure, or more, preferably at least about 25 pounds per square inch above atmospheric pressure, is required.

The temperature within the vaporization or flashing zone is substantially less, i.e. at least 10 degrees Fahrenheit below the temperature of the phosphorus sulfide within the high pressure, high temperature heating zone. Usually, particularly in the instance of manufacturing phosphorus pentasulfide, in accordance with this invention, the temperature of the flashing or vaporization zone is about 950–1000° F. or in the range 50–250 degrees Fahrenheit below the temperature of the liquid phosphorus sulfide within the high temperature, high pressure heating zone. Desirably, the pressure within the flashing or vaporization zone is about atmospheric pressure or slightly above atmospheric pressure and preferably at least about 10 pounds per square inch less than the pressure within the high temperature, high pressure heating zone. The aforesaid temperatures and pressures are for the most part applicable to the manufacture of phosphorus pentasulfide to which the practice of this invention is particularly applicable. Higher and/or lower temperatures and pressures may be employed in the practice of this invention when directed to the manufacture of other phosphorus sulfides or mixtures thereof, such as phosphorus sequisulfide and phosphorus heptasulfide, other than substantially pure phosphorous pentasulfide.

Referring now to the drawing which discloses an embodiment of the practice of this invention as applied to the manufacture of phosphorus pentasulfide of controlled reactivity, liquid sulfur at a temperature of about 300° F. is supplied from tank 10 via line 11 and liquid phosphorus at a temperature of about 190° F. is supplied from tank 12 via line 14 into reactor 15. Desirably, reactor 15 has maintained therein a mass of molten phosphorus pentasulfide at a suitable elevated temperature, such as a temperature in the range 600–800° F., more or less, the mass of molten phosphorus pentasulfide within reactor 15 serving to absorb the heat of reaction between the phosphorus and sulfur to form phosphorus pentasulfide, thereby aiding in controlling the reaction temperature.

Liquid sulfur and liquid phosphorus are supplied to reactor 15 substantially continuously, or intermittently if desired, in the proportions present in the desired phosphorus sulfide product, phosphorus pentasulfide.

Molten phosphorus pentasulfide reaction product is supplied from reactor 15 via line 16 to hold-up tank 17 which is desirably maintained at an elevated temperature in the range 600–800° F. Hold-up tank 17 acts as a source of supply for the molten phosphorus pentasulfide to the high pressure heating operation in the practice of this invention.

Molten phophorus pentasulfide is supplied from hold-up tank 17 via line 18 to high temperature, high pressure heating zone 19 which, preferably, is a tube still. The molten phosphorus pentasulfide travels through coil or tube 20 within heating zone or tube still 19 and therein is subjected to high temperature indirect heat exchange with hot combustion gases resulting from he combustion of fuel and air supplied to tube still 19 via conduit 21. The hot combustion gases or flue gases are removed from tube still 19 via outlet 22.

The molten phosphorus pentasulfide on passing through coil or tubing 20 within tube still 19 is rapidly increased in temperature to about 1100° F. and at the same time a relatively high pressure is maintained within coil or tubing 20 within tube still 19 to prevent vaporization of the phosphorus pentasulfide. A pressure of about 50 pounds per square inch gauge within coil 20 is sufficient to prevent vaporization of the phosphorus pentasulfide therein. The resulting heated, high temperature, high pressure molten phosphorus pentasulfide issues from tube still 19 via line 24 and is passed through expansion valve or orifice 24a directly into relatively low pressure flasher residue receiver 25 which is maintained at a relatively low pressure, e.g. about atmospheric pressure or 0 p.s.i.g., with respect to the pressure maintained within coil 20 of tube still 19. Upon introduction into flasher residue receiver 25 the high temperature, molten phosphorus pentasulfide flashes and is substantially completely vaporized therein. Extraneous solids or impurities accumulating within flasher residue receiver 25 are removed from time to time via conduit 26.

Vaparous phosphorus pentasulfide leaves flasher residue receiver 25 via conduit 28 and enters reflux column 29, which may be a packed column wherein a small amount of condensation of phosphorus pentasulfide may take place with resultant scrubbing of the phosphorus pentasulfide vapors passing upwardly through column 29. Vaporous phosphorus pentasulfide leaves the top of reflux colum 29 via conduit 30 at an elevated temperature, such as about 970° F., substantially the same temperature as that maintained within flasher residue receiver 25.

The vaporized phosphorus pentasulfide is then supplied via conduit 30 through condenser 31 wherein the phosphorus pentasulfide is condensed. The resulting condensed, liquid phosphorus pentasulfide is supplied from condenser 31 via conduit 32 through heat exchanger 34 where it is cooled to about 600–700° F., more or less. The resulting cooled, liquid phosphorus pentasulfide leaves heat exchanger 34 via conduit 35 and is supplied to combination flaker-devitrifier 36.

The interior of flaker-devitrifier 36 is maintained in an inert atmosphere, such as substantially oxygen-free flue gases, nitrogen, carbon dioxide and the like. The molten phosphorus pentasulfide is introduced via conduit 35 into flaker-devitrifier 36 and pan 38 therein. Chilled flaker drum 39 is disposed within flaker-devitrifier 36 to rotate therein such that the chilled outside surface of flaker drum 39 dips into the mass of molten phosphorus pentasulfide within pan 38. Upon rotation of flaker drum 39 in contact with phosphorus pentasulfide in pan 38 the phosphorus pentasulfide is chilled and solidified on the surface of flaker drum 39 and upon continued rotation of flaker drum 39 the resulting chilled, solidified, phosphorus pentasulfide thereon comes into contact with scraper 40 and is removed and transferred thereon to devitrification section of flaker-devitrifier 36. The flaked phosphorus pentasulfide solids are moved along within the divtrification section of flaker-devitrifier by screw conveyor 41 operated by motor 42 while at the same time being subjected to suitable heat treatment therein to adjust the reactivity of the flaked solid phosphorus pentasulfide to the desired reactivity. Depending upon the time of heat treatment of the flaked, solid phosphorus pentasulfide within the devitrifier section and/or the temperature of heat treatment therein, the reactivity of the phosphorus pentasulfide is controlled and adjusted.

Reference is made to copending, coassigned U.S. patent application Serial No. 39,391, filed June 28, 1960, in the name of Robert F. Roth and James A. Taylor, now abandoned which discloses the heat treatment operation for adjusting the reactivity of phosphorus sulfides, such as phosphorus pentasulfide. The disclosures of the above-identified U.S. patent application are herein incorporated and made part of this disclosure.

In the operation of the devitrification section of flaker-devitrifier 36 the flaked phosphorus pentasulfide solids are subjected to an elevated temperature, such as in the range about 390° F. up to the melting point of the phosphorus pentasulfide, for a sufficient period of time to adjust the reactivity of the phosphorus pentasulfide to the desired level. Heat treatment of the flaked phosphorus pentasulfide as it moves within the devitrification section of flaker-devitrifier 36 is effected by passing suitable heat exchange fluid, such as hot Dowtherm liquid or vapor via inlet conduit 44 into jacket 45 surrounding the devitrification section of flaker-devitrifier 36. The heat exchange fluid leaves jacket 45 via outlet line 46.

The resulting devitrified solid phosphorus pentasulfide leaves flaker-devitrifier 36 via outlet line 48 and is supplied to cooler 49 wherein it comes into contact with water cooled screw 50 which is operated by motor 51. Water cooled screw 50 cools the devitrified phosphorus pentasulfide and moves it to outlet line 52 wherein it is discharged from cooler 49 for further processing such as grinding and packing.

Although particular emphasis has been placed in the disclosure of this invention, as illustrated in the accompanying drawing, on the manufacture of phosphorus pentasulfide, the benefits and advantages of this invention are also applicable to the manufacture of other phosphorus sulfides and mixtures thereof.

As will be apparent to those skilled in the art in the light of the foregoing disclosure, many modifications, alterations and substitutions are possible in the practice of this invention without departing from the spirit or scope thereof.

What is claimed is:

1. A method of vaporizing phosphorus pentasulfide to separate said phosphorus pentasulfide from extraneous materials contained as impurities therein which comprises heating a mass of molten phosphorus pentasulfide to an elevated temperature under conditions such that substantially all of the resulting heated phosphorus pentasulfide is maintained in the liquid phase and introducing the resulting heated, molten phosphorus pentasulfide into a flashing zone maintained at a relatively reduced pressure and in the absence of the addition of extraneous heat to effect substantially complete vaporization of all the heated phosphorus pentasulfide preferentially of said contained impurities in said resulting heated molten phosphorus pentasulfide introduced thereinto.

2. A method in accordance with claim 1 wherein said flashing zone is maintained at a pressure about 50 pounds per square inch less than the pressure at which the molten phosphorus pentasulfide is maintained prior to introducing it into said flashing zone.

3. A method in accordance with claim 1 wherein the temperature of the molten phosphorus pentasulfide is about 1100° F. prior to introduction into said flashing zone.

4. A method of producing phosphorus pentasulfide which comprises introducing separate streams of sulfur and phosphorus into a reaction zone to effect reaction between phosphorus and sulfur therein to yield a molten mass of phosphorus pentasulfide having extraneous materials contained as impurities therein, introducing the resulting molten phosphorus pentasulfide into a heating zone maintained at an elevated pressure to retain substantially all of the molten phosphorus pentasulfide introduced thereinto in the liquid phase and heating the phosphorus pentasulfide introduced thereinto to an elevated temperature above about 1000° F. and thereupon introducing the resulting heated molten phosphorous pentasulfide into a flashing zone maintained at substantially atmospheric pressure under conditions in the absence of the addition of extraneous heat to effect vaporization of substantially all of the phosphorus pentasulfide preferentially of said contained impurities in said resulting molten phosphorus pentasulfide introduced thereinto and recovering the resulting vaporized phosphorus pentasulfide from said flashing zone free of said contained impurities.

5. A method for the manufacture of a phosphorus sulfide which comprises reacting phosphorus and sulfur to form a mass of molten phosphorus sulfide having extraneous materials contained as impurities therein, heating the resulting formed molten phosphorus sulfide at an elevated pressure to an elevated temperature such that when the resulting heated phosphorus sulfide is introduced into a flashing zone maintained at about atmospheric pressure and in the absence of the addition of extraneous heat, the resulting molten superheated phosphorus sulfide introduced thereinto is substantially completely vaporized preferentially of said contained impurities for effecting separation of said phosphorus pentasulfide from said contained impurities, condensing the resulting vaporized phosphorus sulfide, solidifying the resulting condensed phosphorus sulfide, subjecting the resulting solidified phosphorus sulfide to an elevated temperature below its melting point to adjust the reactivity thereof to a desired reactivity and recovering the resulting heat treated phosphorus sulfide having a controlled reactivity as product.

References Cited by the Examiner
UNITED STATES PATENTS

| 643,702 | 2/00 | Waterhouse | 202—53 |
| 1,998,998 | 4/35 | Tolman | 202—53 |
| 2,697,067 | 12/54 | Reynolds | 202—53 X |
| 2,794,705 | 6/57 | Hudson | 23—206 |
| 2,803,589 | 8/57 | Thomas | 202—53 |
| 3,011,955 | 12/61 | Brown | 202—53 |

OTHER REFERENCES

Perry: "Chemical Engineers' Handbook," page 585, McGraw-Hill, New York, 1950, 3rd Edition.

MAURICE A. BRINDISI, *Primary Examiner.*